(12) United States Patent
Southern, Jr.

(10) Patent No.: US 6,619,815 B2
(45) Date of Patent: Sep. 16, 2003

(54) LOW-PROFILE LIGHT FIXTURE FOR RECREATIONAL VEHICLES

(75) Inventor: John A. Southern, Jr., Elkhart, IN (US)

(73) Assignee: Liteco, Elkhart, IN (US)

( * ) Notice: Subject to any disclaimer, the term of this patent is extended or adjusted under 35 U.S.C. 154(b) by 0 days.

(21) Appl. No.: 09/975,069

(22) Filed: Oct. 11, 2001

(65) Prior Publication Data

US 2003/0072152 A1 Apr. 17, 2003

(51) Int. Cl.[7] .................................................. F21S 4/00
(52) U.S. Cl. ........................ 362/225; 362/221; 362/223
(58) Field of Search .............................. 362/217, 221, 362/223, 225, 260, 297, 346, 479, 485, 490

(56) References Cited

U.S. PATENT DOCUMENTS

| | | | |
|---|---|---|---|
| 2,268,152 A | | 12/1941 | Jones |
| 2,270,814 A | | 1/1942 | Scribner |
| 2,332,770 A | | 10/1943 | Abernathy |
| 3,328,578 A | * | 6/1967 | Gough ........................ 362/225 |
| 3,803,401 A | | 4/1974 | Drews |
| 4,499,529 A | | 2/1985 | Figueroa |
| 4,536,830 A | | 8/1985 | Wisniewski |
| 4,562,517 A | | 12/1985 | Pankin |
| 4,674,016 A | | 6/1987 | Gallagher |
| 4,719,546 A | | 1/1988 | Spitz |
| 4,928,209 A | | 5/1990 | Rodin |
| 5,062,030 A | | 10/1991 | Figueroa |
| 5,186,537 A | | 2/1993 | Katoh et al. |
| 5,274,533 A | | 12/1993 | Neary et al. |
| 5,412,551 A | | 5/1995 | Newell |
| 5,420,771 A | | 5/1995 | Katoh et al. |
| 5,479,327 A | * | 12/1995 | Chen ........................... 362/222 |
| 5,641,225 A | | 6/1997 | Katoh et al. |
| 5,791,764 A | * | 8/1998 | Jaksich ........................ 362/222 |
| 6,024,468 A | | 2/2000 | Kassay et al. |
| 6,092,913 A | | 7/2000 | Edwards, Jr. |
| 6,170,962 B1 | | 1/2001 | Wordin |

* cited by examiner

*Primary Examiner*—Y. My Quach-Lee
(74) *Attorney, Agent, or Firm*—Price, Heneveld, Cooper, DeWitt & Litton

(57) ABSTRACT

A low-profile light fixture for use in recreational vehicles includes an elongated housing extending along the length of the light fixture, at least one elongated lighting element having at least one electrical connector, and at least one electrical power socket shaped to electrically connect with the electrical connector to supply electrical power to the lighting element. The light fixture also includes an elongated ballast cover extending along the light fixture adjacent the lighting element, and having a raised portion defining a channel between the housing and the ballast cover. The channel is adapted to receive wiring associated with the light fixture therein. The ballast cover further having at least one reflector portion extending between the housing the lighting element. The electrical power sockets of the light fixture are configured to such that the lighting element extends further away from the housing than the raised portion of the ballast cover. A cross-sectional geometry of the ballast is sufficiently arcuate such that light from the lighting element is substantially equally downwardly distributed from the light fixture.

27 Claims, 3 Drawing Sheets

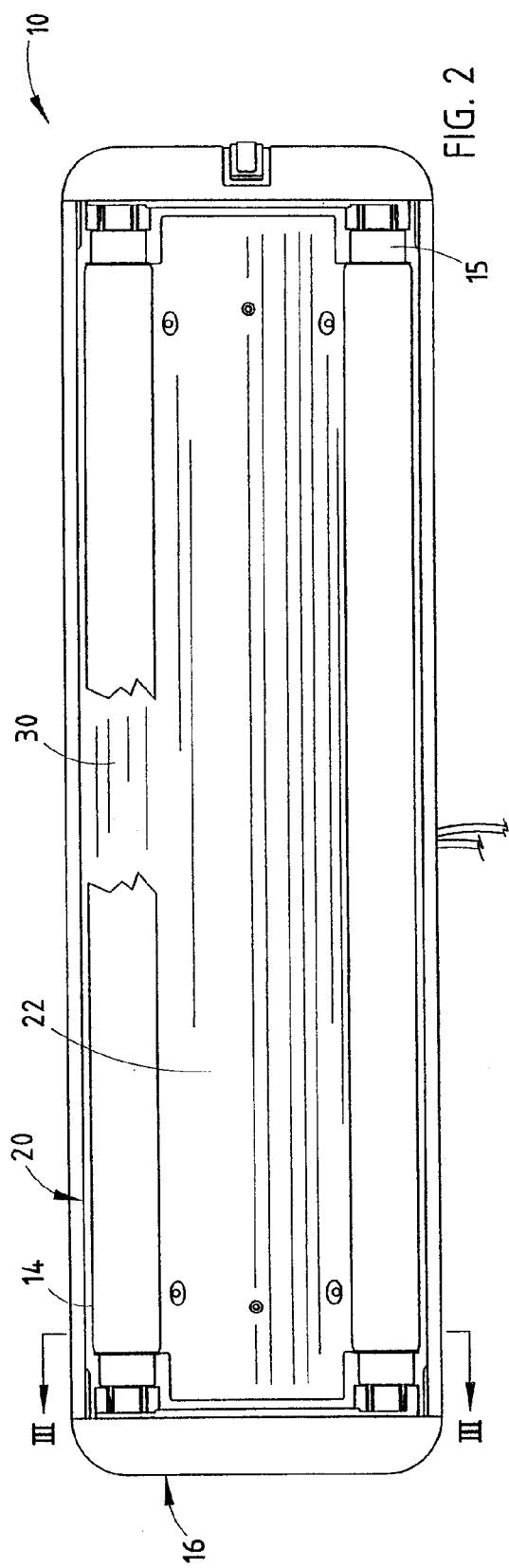
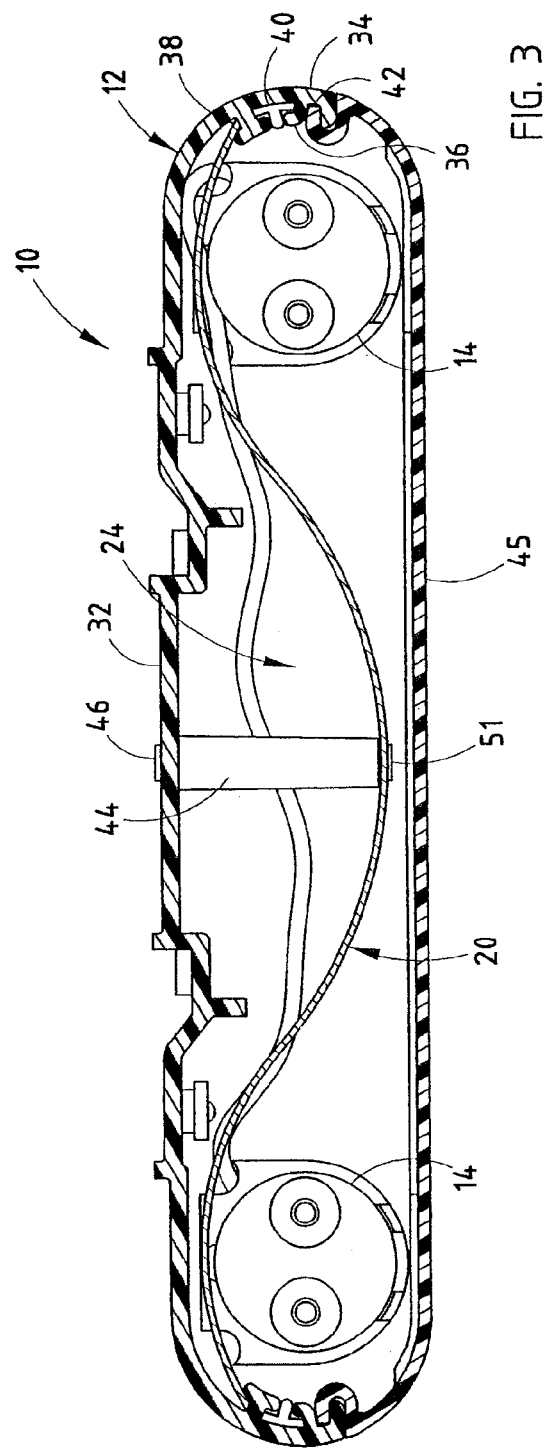

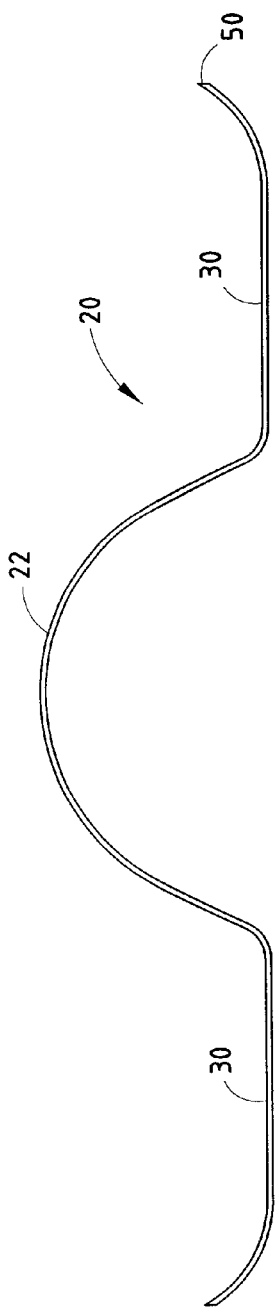
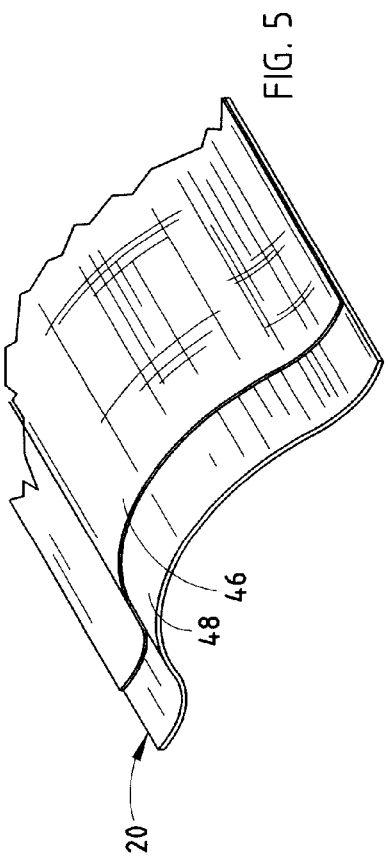
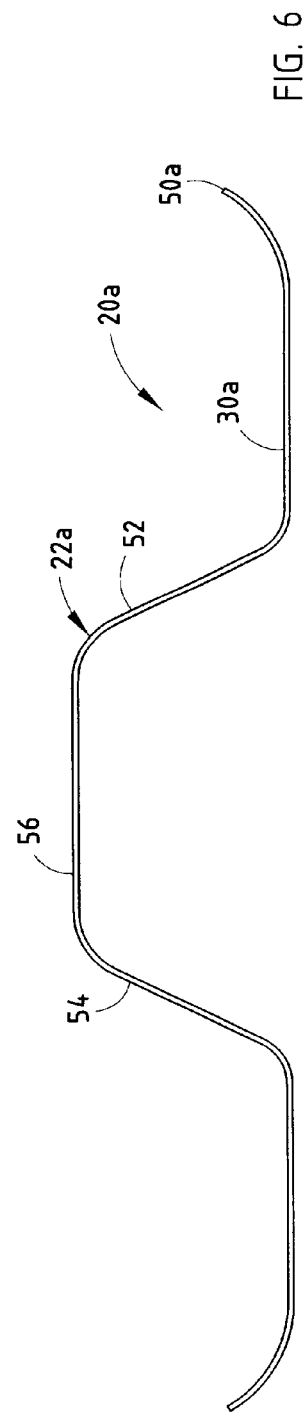

LOW-PROFILE LIGHT FIXTURE FOR RECREATIONAL VEHICLES

BACKGROUND OF THE INVENTION

The present invention relates to lighting fixtures, and in particular to lighting fixtures for use in recreational vehicles.

A wide variety of lighting fixtures are used within recreational vehicles such as travel trailers, motor homes, mini homes, and the like. These applications typically require lighting fixtures that are reduced in size due to the limited amount of space within these kinds of vehicles. These lighting fixtures typically include a housing, a lighting element located within the housing, and a reflector to reflect the light generated by the lighting element outwardly from the housing.

Heretofore, light fixtures used within recreational vehicles have not provided efficient lighting by failing to maximize the outward propagation of light from within the housing as generated by the associated lighting elements. In some instances, these lights utilize a cover extending between lighting elements associated with the light fixture and covering a ballast also associated with the light fixture. These covers are typically configured such that a certain amount of light as generated by the lighting fixtures is blocked from escaping the light fixture, or inappropriately redirects the light as generated, thereby creating "dead-spots" or areas below the light fixture which are insufficiently provided with light, and may even result in dark lines extending along associated translucent out covers which cover the outside of the fixture.

Therefore, a light fixture is needed that provides a compact overall structure while simultaneously providing sufficient lighting for those points within the vicinity of the light fixture.

SUMMARY OF THE INVENTION

One aspect of the present invention is to provide a low-profile light fixture for use in recreational vehicles that includes an elongated housing extending along the length of the light fixture, at least one elongated lighting element having at least one electrical connector, and at least one electrical power socket shaped to electrically connect the electrical connector to supply electrical power to the lighting element. The light fixture also includes an elongated ballast cover extending along the light fixture adjacent the lighting element, that has a raised portion defining a channel between the housing and the ballast cover that is adapted to receive wiring associated with the light fixture therein. The ballast cover also has at least one reflector portion extending between the housing and the lighting element. The electrical power sockets are configured such that the lighting element extends further away from the housing than the raised portion of the ballast, and a cross-sectional geometry of the ballast cover is sufficiently arcuate such that light from the lighting element is substantially equally downwardly distributed from the light fixture.

Another aspect of the present invention is to provide a lighting system for use in recreational vehicles that includes a DC power source, a positive lead wire in electrical communication with the DC power source, a ground wire in electrical communication with the DC power source, and a lighting fixture. The lighting fixture includes an elongated housing extending along the length of the light fixture, at least one elongated lighting element having at least one electrical connector, and at least one electrical power socket and electrical communication with the positive and negative wires and shaped to electrically connect with the electrical connector to supply electrical power to the lighting element. The lighting fixture also includes an elongated ballast cover extending along the lighting fixture adjacent the lighting element and having a raised portion defining a channel between the housing and the ballast cover that is adapted to receive wiring associated with the light fixture therein. The ballast cover also has at least one reflector portion extending between the housing and the lighting element. The electrical power sockets are configured to such that the lighting element extends further away from the housing of the raised portion of the ballast cover, and a cross-sectional geometry of the ballast cover is sufficiently arcuate such that light from the lighting element is substantially equally downwardly distributed from the light fixture.

The principal objects of the present invention are to provide an easy to manufacture, lighting fixture having an uncomplicated design that can be easily and quickly assembled. Further, the light fixture of the present invention provides a low overall profile while simultaneously providing substantially equally downwardly distributed light from the light fixture.

These and other advantages of the invention will be further understood and appreciated by those skilled in the art by reference to the following written specification, claims, and appended drawings.

BRIEF DESCRIPTION OF THE DRAWINGS

FIG. 2 is a top profile view of the light fixture with a cover removed;

FIG. 3 is a side elevation view of the light fixture with an end cover removed;

FIG. 4 is an end view of a first embodiment of a ballast cover of the light fixture;

FIG. 5 is a profile view of an alternative embodiment of the ballast cover with a reflective covering affixed thereto; and FIG. 6 is an end view of a second embodiment of a ballast cover of the light fixture.

DETAILED DESCRIPTION OF THE PREFERRED EMBODIMENT

Figure 1:
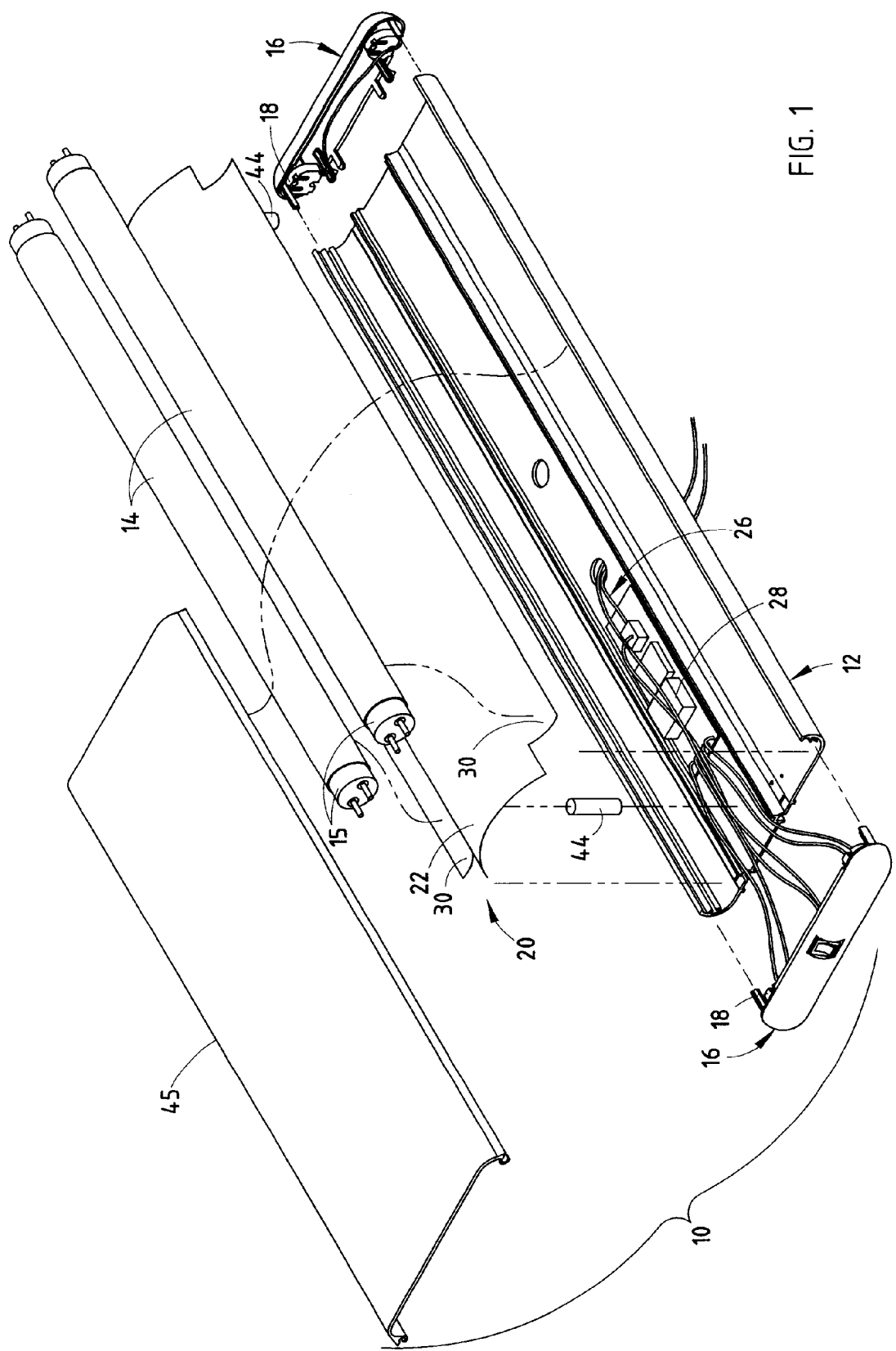
FIG. 1 is an exploded perspective view of the light fixture of the present invention.

For purposes of description herein, the terms "upper," "lower," "right," "left," "rear," "front," "vertical," "horizontal," and derivatives thereof shall relate to the invention as oriented as FIG. 1 in which the light fixture of the present invention is shown with a housing that is typically mounted to an underside of a supporting surface. However, it is to be understood that the invention may assume various alternative orientations and step sequences, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

The reference numeral 10 (FIG. 1) generally designates a light fixture embodying the present invention. In the illustrated example, light fixture 10 includes an elongated housing 12 extending along the length of light fixture 10, a pair of elongated lighting elements 14 each including two electrical connectors 15 positioned at opposite ends of lighting elements 14, and a pair of end covers 16 adapted to connect to housing 12 and each including a pair of electrical power sockets 18 shaped to electrically connect with electrical connectors 15 to supply electrical power to lighting elements 14. The light fixture 10 also includes an elongated ballast cover 20 extending along light fixture 10 adjacent lighting elements 14. The ballast cover 20 has a raised portion defining a channel 24 (FIG. 2) between housing 12 and ballast cover 20. The channel 24 is adapted to receive wiring 26 and a ballast 28 associated with light fixture 10 therein. The ballast cover 20 also has a pair of reflector portions 30 juxtaposed across raised portion 22 and extending between housing 12 and lighting elements 14 when light fixture 10 is fully assembled. The electrical power sockets 18 are configured such that lighting elements 14 each extend further away from housing 12 than raised portion 22 of ballast cover 20, as is best shown in FIG. 2. The cross-sectional geometry of ballast cover 20 is sufficiently arcuate such that light from lighting elements 14 is substantially equally downwardly distributed from lighting fixture 10.

The housing 12 includes an upper surface 32 adapted to abut a mounting surface (not shown). Housing 12 also includes a pair of downwardly turned sidewalls 34, each including an interior surface 36. The interior surface 36 of each sidewall 34 includes a first channel 38, second channel 40, and third channel 42. First channel 38 is adapted to receive ballast cover 20 therein as described below. Second channel 40 is adapted to receive a portion of one of the end covers 16 therein. Channel 42 is adapted to receive an edge of a cover 45 therein. Cover 45 is preferably constructed of a translucent plastic material adapted to evenly diffuse the light provided by lighting elements 14. Housing 12 still further includes a pair of supporting posts 44 extending downwardly from housing 12 and fixedly attached thereto via a rivet fastener 46.

The lighting elements 14 are preferably linear, fluorescent-type lights. However, other forms and types of lighting elements may be substituted therefor.

In a first embodiment as shown in FIG. 4, raised portion 22 of ballast cover 20 is entirely arcuate with its center of radius being coplanar with reflector portions 30. In a preferred embodiment, the radius of raised portion 22 is greater than or equal to about 0.80 inches, and more preferably is greater than or equal to about 0.86 inches. However, it should be noted that other radii for raised portion 22 may be substituted, as long as raised portion 22 does not include any sharp corners or abrupt changes between planar surface areas. Ballast cover 20 is also preferably constructed of a light reflective material. Alternatively, ballast cover 20 (FIG. 5) may also be covered with a reflective material 46 on a lower surface 48 thereof.

In assembly, ballast cover 20 is placed within housing 12 such that raised portion 22 covers support posts 44 and edges 50 of ballast cover 20 rest within first channels 38 of housing 12. Ballast cover 20 is securely held in place by a rivet connector 51 (FIG. 3).

The reference numeral 20a (FIG. 6) generally designates another embodiment of the ballast cover of the present invention. Since ballast cover 20a is similar to the previously described ballast cover 20, similar parts appearing in FIG. 4 and FIG. 6 respectfully are represented by the same, corresponding reference numeral, except for the suffix (a) in the numerals of the latter. In the alternative embodiment, raised portion 22a includes a first downwardly extending wall 52 and a second downwardly extending wall 54. First downwardly extending wall 52 and second downwardly extending wall 54 are integrally formed with reflector portions 30a. Raised portion 22a further includes a third wall 56 integrally formed with and extending between walls 52 and 54. Preferably, walls 52 and 54 form greater than or equal to a 120° angle with the respective reflective portions 30a. Further, the radius of the bends between wall 56 and walls 52 and 54 are preferably greater than or equal to 0.2 inches and more preferably greater than or equal to 0.23 inches. Thereby allowing light to evenly reflect downwardly and prevent uneven light scattering, and/or "deadspots" or dark lines being cast along cover 45.

It is become apparent to those skilled in the art that various modifications to the preferred embodiment of the invention and the examples as described and illustrated herein can be made without departing from the spirit or scope of the invention as defined by the appended claims.

The invention claimed is:

1. A low profile light fixture for use in recreational vehicles, comprising:
    an elongated housing extending along the length of the light fixture;
    at least one elongated lighting element comprising a first elongated lighting element and a second elongated lighting element each comprising at least one electrical connector;
    at least one electrical power socket shaped to electrically connect with the electrical connector to supply electrical power to the lighting element; and
    an elongated ballast cover extending along the light fixture adjacent the lighting element, the ballast cover comprising a raised portion extending between the first and second lighting elements defining a channel between the housing and the ballast cover, the channel adapted to receive wiring associated with the light fixture therein, the ballast cover further comprising at least one reflector portion extending between the housing and the lighting element;
    wherein the electrical power sockets are configured such that the lighting element extends further away from the housing than the raised portion of the ballast cover, and wherein a cross-sectional geometry of the ballast cover is sufficiently arcuate such that light from the lighting element is substantially equally downwardly distributed from the light fixture.

2. The light fixture of claim 1, wherein the at least one reflector portion comprises a first reflector portion extending between the housing and the first lighting element and a second reflector portion extending between the housing and the second lighting element.

3. The light fixture of claim 2, wherein the raised portion of the ballast cover is entirely arcuately shaped.

4. The light fixture of claim 3, wherein the raised portion of the ballast cover has a central arc radius of at least 0.8 inches.

5. The light fixture of claim 1, wherein the ballast cover is covered with a light reflective coating.

6. The light fixture of claim 1, wherein the ballast cover is constructed of a light reflective material.

7. The light fixture of claim 1, further including:
    a cover removably attached to the housing and adapted to defuse the light from the lighting element.

8. The light fixture of claim 1, wherein the at least one lighting element further comprises a fluorescent-type bulb.

9. The light fixture of claim 8, wherein the at least one electrical connector comprises a first and second electrical connector positioned at opposite ends of the lighting element.

10. The light fixture of claim 9, wherein the at least one electrical power socket comprises two power sockets at opposite ends of the lighting element.

11. The light fixture of claim 10, wherein the two power sockets receive the opposite ends of the lighting elements therein to physically support the same.

12. A low profile light fixture for use in recreational vehicles, comprising:
    an elongated housing extending along the length of the light fixture;
    a first elongated lighting element and a second elongated lighting element each comprising at least one electrical connector;
    at least one electrical power socket shaped to electrically connect with the electrical connector to supply electrical power to the lighting elements; and
    an elongated ballast cover extending along the light fixture adjacent the lighting elements, the ballast cover comprising a raised portion extending between the first and second lighting elements and defining a channel between the housing and the ballast cover, the channel adapted to receive wiring associated with the light fixture therein, the ballast cover further comprising a first reflector portion extending between the housing and the first lighting element and a second reflector portion extending between the housing and the second lighting element, the raised portion of the ballast cover comprises a first wall and a second wall extending downwardly from the first and second reflector portions, respectively, and wherein the first and second walls of the ballast cover form an angle of at least 120° with respect to the first and second reflector portions, respectively;
    wherein the electrical power sockets are configured such that the lighting element extends further away from the housing than the raised portion of the ballast cover, and wherein a cross-sectional geometry of the ballast cover is sufficiently arcuate such that light from the lighting element is substantially equally downwardly distributed from the light fixture.

13. The light fixture of claim 12, wherein the raised portion of the ballast cover further comprises a third wall integrally formed with and extending between the first wall and the second wall forming a bend portion therebetween, and wherein the bend portions each have a curvature radius of greater than or equal to about 0.2 inches.

14. A lighting system for use in recreational vehicles, comprising:
    a DC power source;
    a positive lead wire in electrical communication with the DC power source;
    a ground wire in electrical communication with the DC power source; and
    a light fixture, comprising:
        an elongated housing extending along the length of the light fixture;
        at least one elongated lighting element comprising at least one electrical connector;
        at least one electrical power socket in electrical communication with the positive and ground wires and shaped to electrically connect with the electrical connector to supply electrical power to the lighting element; and
        an elongated ballast cover extending along the light fixture adjacent the lighting element, the ballast cover comprising a raised portion defining a channel between the housing and the ballast cover, the channel adapted to receive wiring associated with the light fixture therein, the ballast cover further comprising at least one reflector portion extending between the housing and the lighting element;
        wherein the electrical power sockets are configured such that the lighting element extends further away from the housing than the raised portion of the ballast cover, and wherein a cross-sectional geometry of the ballast cover is sufficiently arcuate such that light from the lighting element is substantially equally downwardly distributed from the light fixture.

15. The lighting system of claim 14, wherein the at least one lighting element of the light fixture comprises a first elongated lighting element and a second elongated lighting element, and wherein the raised portion of the ballast cover extends between the first and second lighting elements.

16. The lighting system of claim 15, wherein the at least one reflector portion of the light fixture comprises a first reflector portion extending between the housing and the first lighting element and a second reflector portion extending between the housing and the second lighting element.

17. The lighting system of claim 16, wherein the raised portion of the ballast cover of the light fixture is entirely arcuately shaped.

18. The lighting system of claim 17, wherein the raised portion of the ballast cover of the light fixture has a central arc radius of at least 0.8 inches.

19. The lighting system of claim 14, wherein the ballast cover of the light fixture is covered with a light reflective coating.

20. The lighting system of claim 14, wherein the ballast cover of the light fixture is constructed of a light reflective material.

21. The lighting system of claim 14, wherein the light fixture further comprises a cover removably attached to the housing and adapted to defuse the light from the lighting element.

22. The lighting system of claim 14, wherein the at least one lighting element further comprises a fluorescent-type bulb.

23. The lighting system of claim 22, wherein the at least one electrical connector of the light fixture comprises a first and second electrical connector positioned at opposite ends of the lighting element.

24. The lighting system of claim 23, wherein the at least one electrical power socket comprises two power sockets at opposite ends of the lighting element.

25. The lighting system of claim 24, wherein the two power sockets receive the opposite ends of the lighting elements therein to physically support the same.

26. A lighting system for use in recreational vehicles, comprising:
    a DC power source;
    a positive lead wire in electrical communication with the DC power source;
    a ground wire in electrical communication with the DC power source; and
    a light fixture, comprising:
        an elongated housing extending along the length of the light fixture;
        a first elongated lighting element and a second elongated lighting element each comprising at least one electrical connector;

at least one electrical power socket in electrical communication with the positive and ground wires and shaped to electrically connect with the electrical connector to supply electrical power to the lighting elements; and an elongated ballast cover extending along the light fixture adjacent the lighting elements, the ballast cover comprising a raised portion extending between the first and second lighting elements and defining a channel between the housing and the ballast cover, the channel adapted to receive wiring associated with the light fixture therein, the ballast cover further comprising a first reflector portion extending between the housing and the first lighting element and a second reflector portion extending between the housing and the second lighting element, the raised portion of the ballast cover of the light fixture comprises a first wall and a second wall extending downwardly from the first and second reflector portions, respectively, and wherein the first and second walls of the ballast cover form an angle of at least 120° with respect to the first and second reflector portions, respectively;

wherein the electrical power sockets are configured such that the lighting element extends further away from the housing than the raised portion of the ballast cover, and wherein a cross-sectional geometry of the ballast cover is sufficiently arcuate such that light from the lighting element is substantially equally downwardly distributed from the light fixture.

27. The lighting system of claim 26, wherein the raised portion of the ballast cover of the light fixture further comprises a third wall integrally formed with and extending between the first wall and the second wall forming a bend portion therebetween, and wherein the bend portions each have a curvature radius of greater than or equal to about 0.2 inches.

* * * * *